UNITED STATES PATENT OFFICE.

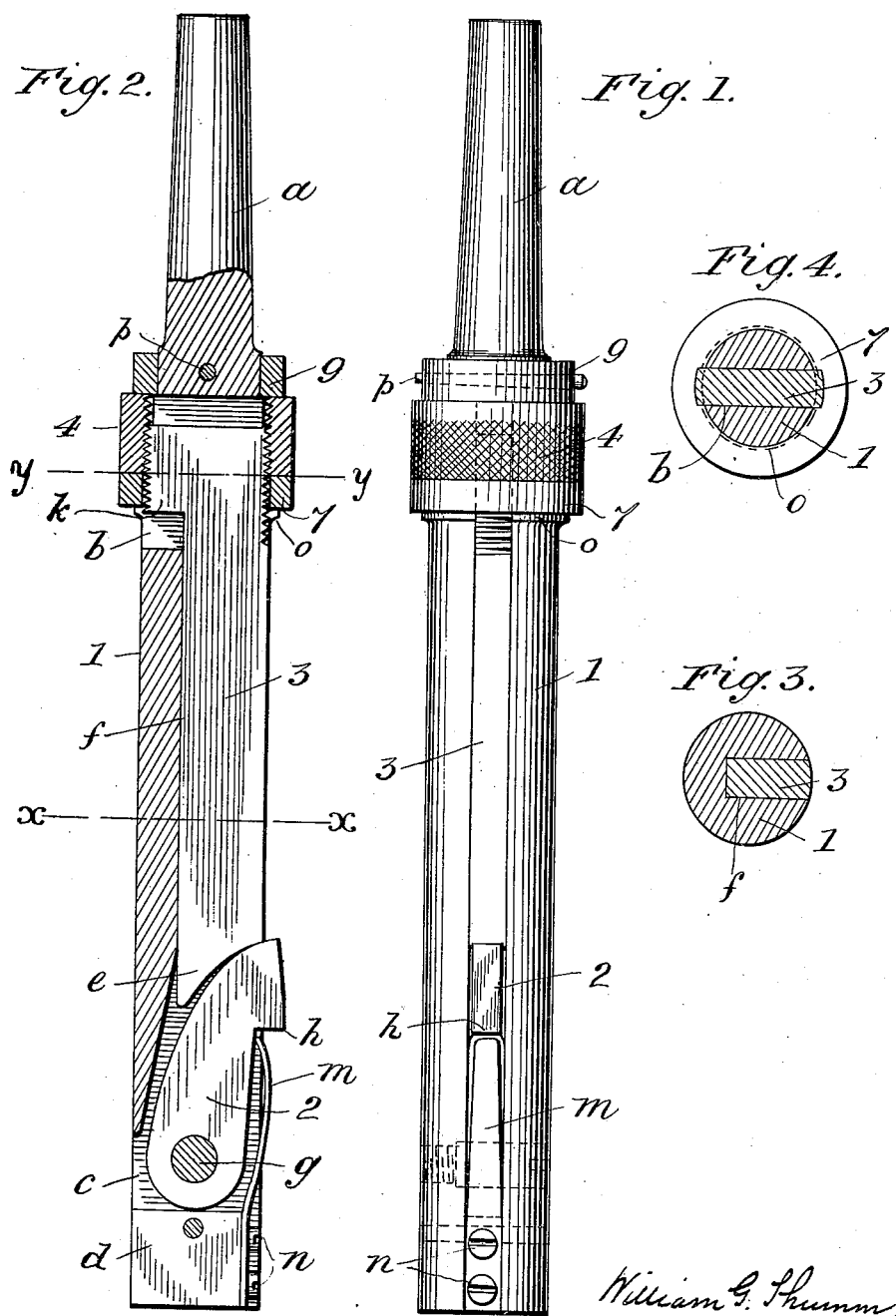

WILLIAM G. THUMM, OF BALTIMORE, MARYLAND, ASSIGNOR OF ONE-HALF TO LEWIS M. KEIZER, OF BALTIMORE, MARYLAND.

TOOL FOR CUTTING KEY-SEATS IN THE HUBS OF WHEELS.

1,070,750.  Specification of Letters Patent.  Patented Aug. 19, 1913.

Application filed August 1, 1912. Serial No. 712,695.

*To all whom it may concern:*

Be it known that I, WILLIAM G. THUMM, of the city of Baltimore and State of Maryland, have invented an Improved Tool for Cutting Key-Seats in the Hubs of Wheels, of which the following is a specification.

In the description of the said invention which follows, reference is made to the accompanying drawing, forming a part hereof, and in which:

Figure 1 is an exterior front view of the improved tool, and Fig. 2 a sectional side view of the same. Fig. 3 is a section taken on the broken line $x$—$x$ in Fig. 2, and Fig. 4 is a section taken on the broken line $y$—$y$ in the same figure.

Referring now to the drawing, 1 is a cylindrical bar having a tapered end $a$ adapted to enter and fit the socket of an ordinary drill press, or any similar appliance fitted to produce in the bar, an up-and-down motion. The upper end of the cylindrical bar 1 is provided with a diametric slot $b$, and its lower end has a similar slot $c$ in which is fastened the block $d$; and extending between the slots $b$ and $c$, is a channel $f$ of a width corresponding with that of the slots.

2 is a curved cutter pivoted at $g$ in the slot $c$, having at its free end a cutting tooth $h$ which can be projected beyond, or drawn within the circumference of the bar.

3 is a flat plate situated in the channel $f$, and adapted to slide longitudinally of the same. The part $k$ of the plate 3, projects laterally beyond the remaining portion, and enters the upper slot $b$, and the edges of the bar are threaded to receive a circular nut 4 hereinafter more particularly referred to. The lower end $e$ of the flat plate 3 is curved as shown in Fig. 2, and bears against the curved surface of the cutter 2 which is normally held with its cutting tooth within the circumference of the cylindrical bar by means of a spring $m$ fastened to the block $d$, by the screws $n$.

7 is a collar on the cylindrical bar 1 the under face of which rests on a shoulder $o$ (shown in dotted lines only in Fig. 4) formed by reducing the diameter of the bar, and 9 a second collar fastened to the cylindrical bar 1 by a pin $p$; and interposed between these two collars is the circular nut 4 before referred to.

By reference to Fig. 2 it will be seen that the depth of the overhanging part $k$ of the flat plate 3 is less than that of the upper slot $b$, and in consequence, the plate is susceptible of longitudinal adjustment in the channel of the cylindrical bar 1 by turning the nut 4.

Supposing that a key-seat is to be cut in the hub of a wheel, a tool is selected having a diameter corresponding with that of the hole in the hub, and its tapered end inserted in a press socket which is directly over the hub. The nut 4 is then turned so as to give such projection of the tooth $h$ beyond the circumference of the bar, as is necessary to produce the first cut, when the tool is forced downward through the hub and a key-seat of a limited depth thereby produced. Upon the tool being raised, the nut is again turned to increase the projection of the cutting tooth, and a second cut taken, and this operation is continued until the required depth of key-seat is obtained.

I claim as my invention:—

1. In a tool for the purpose described, a cylindrical bar having therein a longitudinally disposed groove terminating at one end in a transverse slot which extends diametrically across the bar, combined with a slidable plate which is situated in the said groove and is provided with an overhanging head which rests in the slot, and is threaded at its edges, a nut for the threaded plate susceptible of a circumferential motion only, a cutter pivoted in the groove, and means operated by the longitudinal movement of the slidable plate for operating the cutter.

2. In a tool for the purpose described a cylindrical bar having therein a longitudinally disposed groove terminating at its upper end in a transverse slot which extends diametrically across the bar, combined with a slidable plate situated within the groove, and provided at its upper end with a threaded head which is within and adapted to have an up-and-down movement within the slot, and having at its lower end an inclined surface, a nut on the threaded portion of the plate susceptible of a circumferential motion only, a spring-held cutter pivoted within the groove, and means operated by the longitudinal movement of the slidable plate for operating the cutter.

WILLIAM G. THUMM.

Witnesses:
WM. T. HOWARD,
JULIA B. ROBINSON.

Copies of this patent may be obtained for five cents each, by addressing the "Commissioner of Patents, Washington, D. C."